US012546453B1

(12) United States Patent
Xu et al.

(10) Patent No.: US 12,546,453 B1
(45) Date of Patent: Feb. 10, 2026

(54) LED LAMP WITH SLIDEABLY ADJUSTABLE LENS PLATE

(71) Applicant: SHENZHEN SNC OPTO ELECTRONIC CO., LTD., Guangdong (CN)

(72) Inventors: Jianyong Xu, Guangdong (CN); Zhikeng Mo, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 19/011,665

(22) Filed: Jan. 7, 2025

(30) Foreign Application Priority Data

Oct. 21, 2024 (CN) ......................... 202422533180.1

(51) Int. Cl.
*F21V 29/70* (2015.01)
*F21V 5/00* (2018.01)
*F21V 23/00* (2015.01)
*F21V 23/04* (2006.01)
*F21Y 105/10* (2016.01)
*F21Y 113/00* (2016.01)

(52) U.S. Cl.
CPC ............ *F21V 5/007* (2013.01); *F21V 23/003* (2013.01); *F21V 23/04* (2013.01); *F21V 29/70* (2015.01); *F21Y 2105/10* (2016.08); *F21Y 2113/00* (2013.01)

(58) Field of Classification Search
CPC ...... F21V 19/0045; F21V 14/06; F21V 29/70; F21V 19/003; F21V 19/0015; F21V 5/007; F21V 23/003; F21Y 2105/10
See application file for complete search history.

(56) References Cited

U.S. PATENT DOCUMENTS 7,303,310 B2 * 12/2007 You ..................... F21V 19/0045 362/240
7,405,944 B2 * 7/2008 Mayer ................. F21V 19/0045 361/752
7,674,010 B2 * 3/2010 Griffiths .............. F21V 19/0045 362/240
7,686,469 B2 * 3/2010 Ruud .................... F21V 19/003 362/249.02
7,854,527 B2 * 12/2010 Anderson ........... F21V 19/0045 362/217.1
7,896,524 B2 * 3/2011 Yoneda ................... F21V 14/02 362/245
8,042,969 B2 * 10/2011 Paik ........................ F21V 13/04 362/249.02
8,052,301 B2 * 11/2011 Zhou ................... F21V 19/0045 362/249.02
8,066,404 B2 * 11/2011 Song ....................... F21V 29/70 362/396

(Continued)

*Primary Examiner* — Ismael Negron

(57) ABSTRACT

A lamp includes a heat sink, a mounting groove formed on a front side of the heat sink with a groove wall enclosing the mounting groove; an LED panel mounted in the mounting groove; a driving power supply electrically connected to the LED lamp panel; a lens plate covering the LED lamp panel and configured to slide relative to the groove wall; a pressing frame covering the lens plate and fixed to the heat sink; and at least a pair of telescoping rolling balls provided to ends of cylinders connected to the heat sink, the lens plate configured to slide on the rolling balls.

9 Claims, 6 Drawing Sheets

(56) References Cited

U.S. PATENT DOCUMENTS

| | | | | |
|---|---|---|---|---|
| 8,398,260 B2 * | 3/2013 | Fan | F21V 29/70 | 362/218 |
| 8,813,399 B2 * | 8/2014 | Miedema | F21V 5/007 | 362/237 |
| 9,039,238 B2 * | 5/2015 | Kim | F21V 29/70 | 362/345 |
| 9,062,857 B2 * | 6/2015 | Moon | F21V 19/0045 | |
| 10,054,296 B2 * | 8/2018 | Chamberlain | F21V 19/0045 | |
| 10,253,963 B2 * | 4/2019 | Chen | F21V 29/763 | |
| 10,746,392 B1 * | 8/2020 | Wu | F21V 23/002 | |
| 11,118,758 B1 * | 9/2021 | Greenspan | F21V 5/045 | |
| 11,353,195 B2 * | 6/2022 | Lang | F21V 14/04 | |
| 11,435,071 B1 * | 9/2022 | Henrici | F21V 19/0045 | |
| 11,754,261 B2 * | 9/2023 | Smets | F21V 14/06 | 362/282 |
| 11,781,736 B2 * | 10/2023 | Wang | F21V 19/003 | 362/241 |
| 12,117,143 B1 * | 10/2024 | Xu | F21V 14/06 | |
| 2007/0047229 A1 * | 3/2007 | Lee | F21V 19/0045 | 362/240 |
| 2009/0185379 A1 * | 7/2009 | Chen | F21V 19/0045 | 362/373 |
| 2013/0242570 A1 * | 9/2013 | Chen | F21V 19/0045 | 362/362 |
| 2018/0038578 A1 * | 2/2018 | Son | F21V 19/003 | |

* cited by examiner

LED LAMP WITH SLIDEABLY ADJUSTABLE LENS PLATE

CROSS-REFERENCE TO RELATED APPLICATIONS

The present application claims priority of Chinese Patent Application No. 2024225331801, filed with the Chinese Patent Office on Oct. 21, 2024, and entitled "LED LAMP", the entire content of which is incorporated herein in its entity.

TECHNICAL FIELD

The present disclosure relates to the field of lighting devices, and in particular relates to an LED lamp.

BACKGROUND

LED lamps have many advantages such as energy-saving, environmental protection, long life and so on, and have been widely used in various lighting places. The conventional LED lamp generally includes a lens plate, and the lens plate is generally fixed to a heat dissipation base by screws. Due to a large number of screws and the need to use a screwdriver, the assembly of the lens plate is slow and inconvenient, the efficiency is low, and the labor cost is high. Since different countries or different places of use have different requirements for light distribution, users may replace different types of lens plates according to their own needs. At this time, if a screwdriver is needed to disassemble the lens plate, which is very inconvenient for the user. In addition, the lens plate only has one light output angle. When a light-emitting angle of the LED lamp needs to be adjusted, the lens plate needs to be replaced according to different requirements, which increases the cost of purchasing the lens plate.

SUMMARY

According to various embodiments, an LED lamp is provided.

An LED lamp includes: a heat sink, a front side of the heat sink being provided with a mounting groove, the heat sink comprising a groove wall enclosing the mounting groove; an LED lamp panel mounted in the mounting groove; a driving power supply electrically connected to the LED lamp panel and configured to supply power to the LED lamp panel; a lens plate covering the LED lamp panel and movably connected to the groove wall; and a pressing frame covering the lens plate and fixed to the heat sink.

In one of the embodiments, The LED lamp further includes at least one pair of cylinders connected to the heat sink and facing the lens plate, wherein a telescopic rolling ball is provided to an end of each cylinder adjacent to the lens plate, the rolling ball abuts against the lens plate, and the lens plate is capable of sliding on the rolling ball.

In one of the embodiments, the lens plate further includes a dial, and the pressing frame is provided with a display window corresponding to the dial.

In one of the embodiments, the lens plate includes a lens main body including a first surface and a second surface that are opposite to each other, an outer lens provided on the first surface, and an inner lens provided the second surface corresponding to the outer lens. The outer lens and the inner lens are substantially strip-shaped, the inner lens protrudes toward the LED lamp panel, the outer lens protrudes away from the LED lamp panel, and light emitted by the LED lamp panel is scattered by the inner lens, and then is converged by the outer lens and emitted to an external environment.

In one of the embodiments, the outer lens includes a first outer lens and a second outer lens, an outer surface of the first outer lens and an outer surface of the second outer lens are both convex arc-shaped surfaces, and the outer surface of second outer lens is higher than the outer surface of the first outer lens.

In one of the embodiments, the inner lens includes a first inner lens and a second inner lens, and an outer surface of the first inner lens and an outer surface of the second inner lens are both flat surfaces.

In one of the embodiments, the first outer lens includes a plurality of lens portions arranged in rows.

In one of the embodiments, the LED lamp further comprises a mounting plate and a force applying portion provided on an edge of the lens main body, the mounting plate is movably connected to the groove wall, and the force applying portion is configured to drive the lens plate to move.

In one of the embodiments, the LED lamp further includes a power supply box connected to a back side of the heat sink, the driving power supply is mounted in the power supply box.

In one of the embodiments, the LED lamp further includes a power controller and a color temperature controller that are mounted in the power supply box, the power controller includes a switch base, a first electronic switch, and a first toggle; the first electronic switch is fixed to the switch base, the first electronic switch is electrically connected to the driving power supply and the LED lamp panel, the first toggle is connected to the first electronic switch and is configured to be toggled to change a state of the first electronic switch, the color temperature controller includes a switch base, a second electronic switch, and a second toggle; the second electronic switch is fixed to the switch base, the second electronic switch is electrically connected to the driving power supply and the LED lamp panel, and the second toggle is connected to the second electronic switch and is configured to be toggled to change a state of the second electronic switch.

These and other features of the present invention will become readily apparent upon further review of the following specification and drawings.

BRIEF DESCRIPTION OF THE DRAWINGS

The drawings are for illustrative purposes only and are only schematic drawings, not physical drawings, and shall not be construed as limiting this patent. In order to better explain the embodiment of the utility model, some parts of the drawings may be omitted, enlarged or reduced, which does not represent the size of the actual product. It will be appreciated by those skilled in the art that some of the known structures and their descriptions in the drawings may be omitted.

DESCRIPTION OF REFERENCE SIGNS

Figure 1:
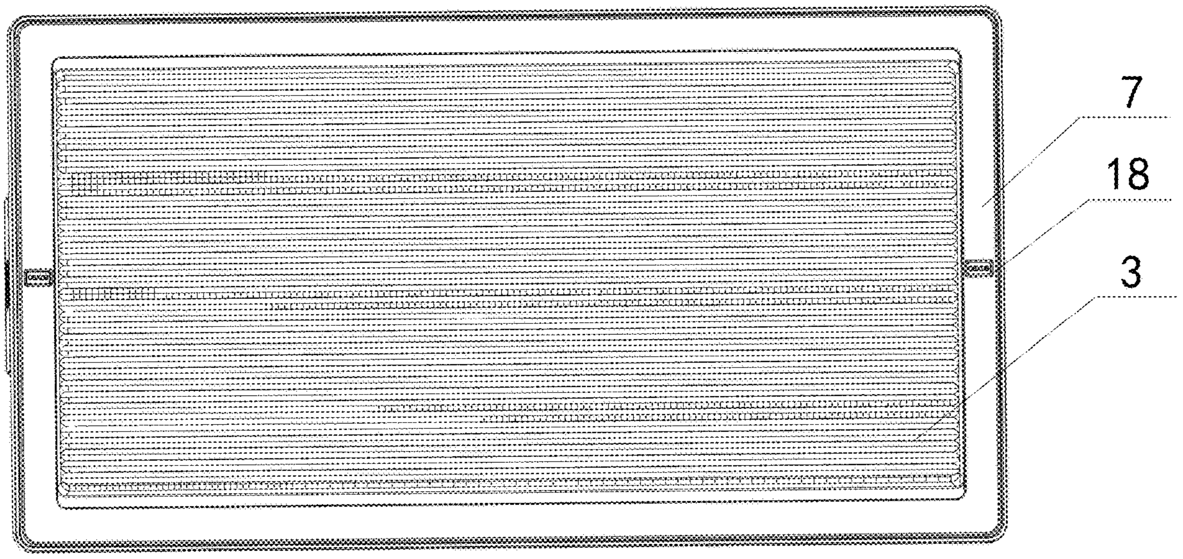
FIG. 1 is a front view of an LED lamp according to an embodiment.
Figure 2:
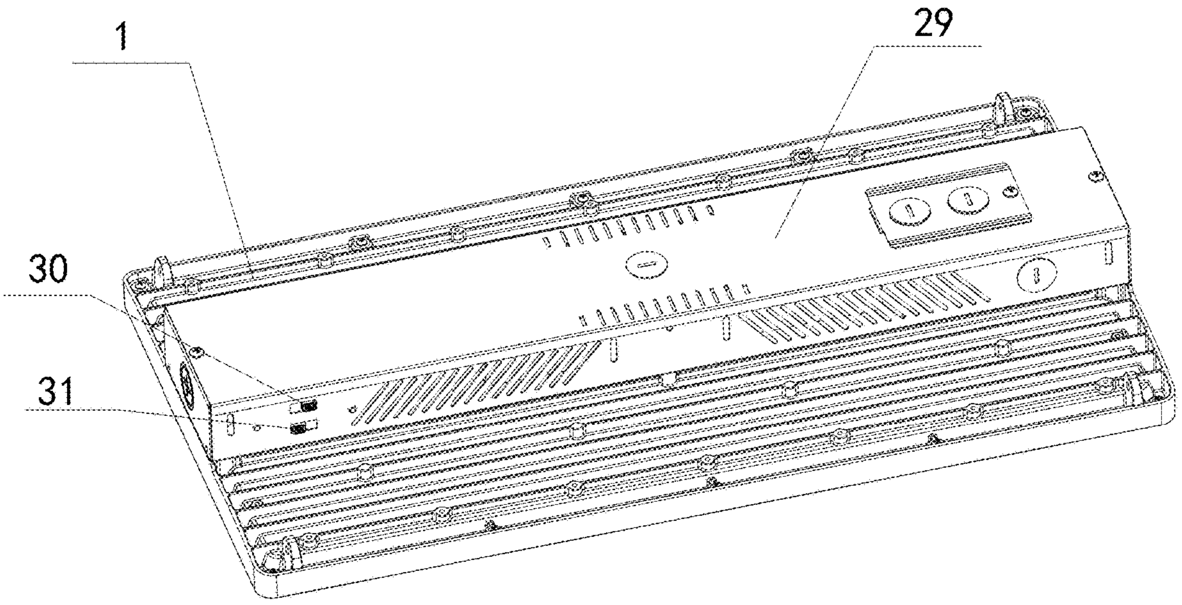
FIG. 2 is a perspective view of the LED lamp according to an embodiment.

1. Heat sink; 2. LED lamp panel; 3. Lens plate; 4. Drive power supply; 5. Mounting groove; 6. Groove wall; 7. Pressing frame; 8. Cylinder; 9. Telescopic rolling ball; 10. Circular groove; 11. First circular groove; 12. Second circular groove; 13. Third circular groove; 14. Fourth circular groove; 15. First rolling ball; 16. Second rolling ball; 17. Dial; 18. Display window; 19. Lens main body; 20. Outer lens; 21. Inner lens; 22. First inner lens; 23. Second inner lens; 24. First outer lens; 25. Second outer lens; 26. Lens portion; 27. Mounting plate; 28. Force applying portion; 29. Power box cover; 30. Power controller; 31. Color temperature controller; 32. Switch box; 33. Switch base; 34. First electronic switch; 35. First toggle; 36. Second electronic switch; 37. Second toggle; 38. First toggle cover; 39. Second toggle cover; 40. Lamp bead.

DETAILED DESCRIPTION OF THE EMBODIMENTS

The technical solution in the embodiment of the present disclosure will be clearly and completely described below in conjunction with the drawings in the embodiment of the application. Apparently, the described embodiments are only some of the embodiments of the application, not all of them. Based on the embodiments in the present disclosure, all other embodiments obtained by a person skilled in the art without making creative efforts shall all fall within the protection scope of the present disclosure.

In the drawings of the embodiments of the present disclosure, the same or similar numbers correspond to the same or similar components. In the description of the present disclosure, it should be understood that terms “upper”, “lower”, “front” and “rear”, “left”, “right”, “vertical”, “horizontal”, “lateral”, “longitudinal”, “top”, “bottom”, “inner”, “outer”, and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 5, according to an embodiment of the present disclosure, an LED lamp includes a heat sink 1, an LED lamp panel 2, a lens plate 3, and a driving power supply 4. The driving power supply 4 is electrically connected to the LED lamp panel 2 and configured to supply power to the LED lamp panel 2. A front side of the heat sink 1 is provided with a mounting groove 5, and the heat sink 1 includes a groove wall 6 enclosing the mounting groove 5. The LED lamp panel 2 is mounted in the mounting groove 5. The lens plate 3 covers the LED lamp panel 2 and is movably connected to the groove wall 6. The LED lamp further includes a pressing frame 7 covering the lens plate 3 and fixed to the heat sink 1. The LED lamp panel 2 includes a plurality of groups of lamp beads 40 arranged in a matrix.

When a light-emitting angle of the LED lamp needs to be adjusted, the lens plate 3 can be pushed to move in a preset direction, such as in a left-right direction, so that the lamp beads 40 of the LED lamp panel 2 correspond to an angle required by the lens plate 3, so as to adjust the light-emitting angle of the LED lamp.

Figure 3:
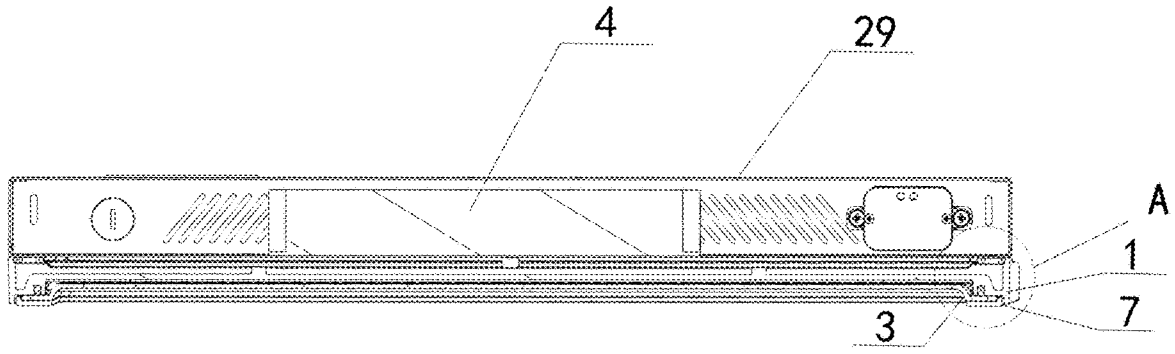
FIG. 3 is a cross-sectional view of the LED lamp of FIG. 2.
Figure 4:
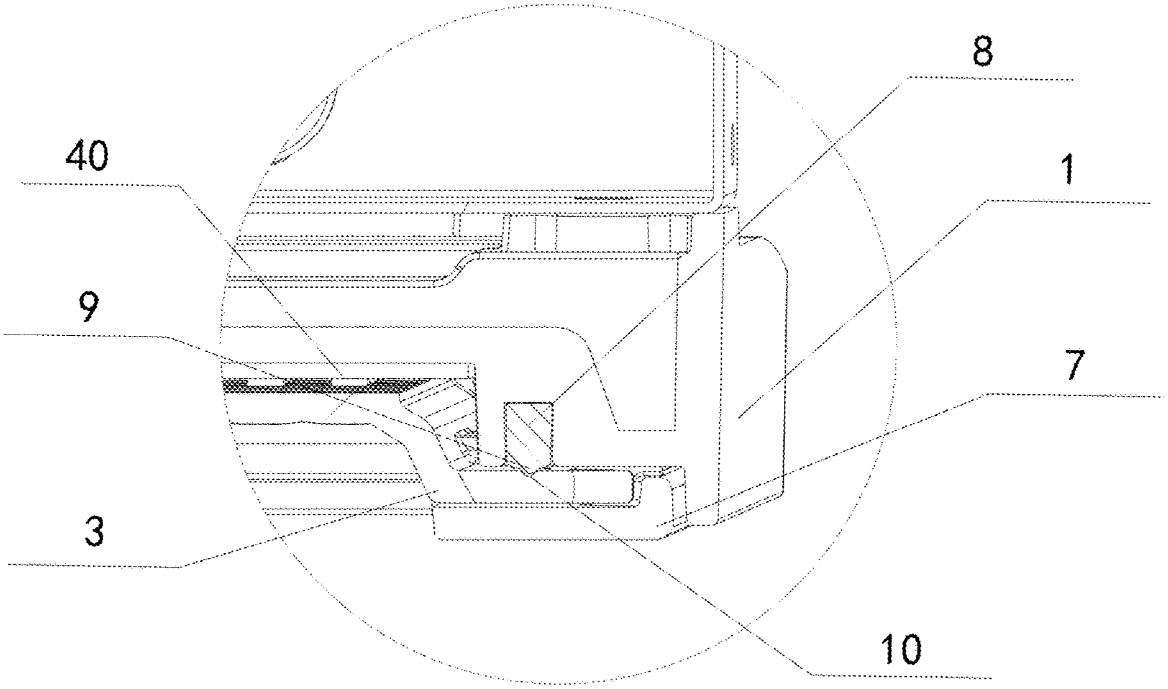
FIG. 4 is an enlarged view of a portion A of FIG. 3.
Figure 9:
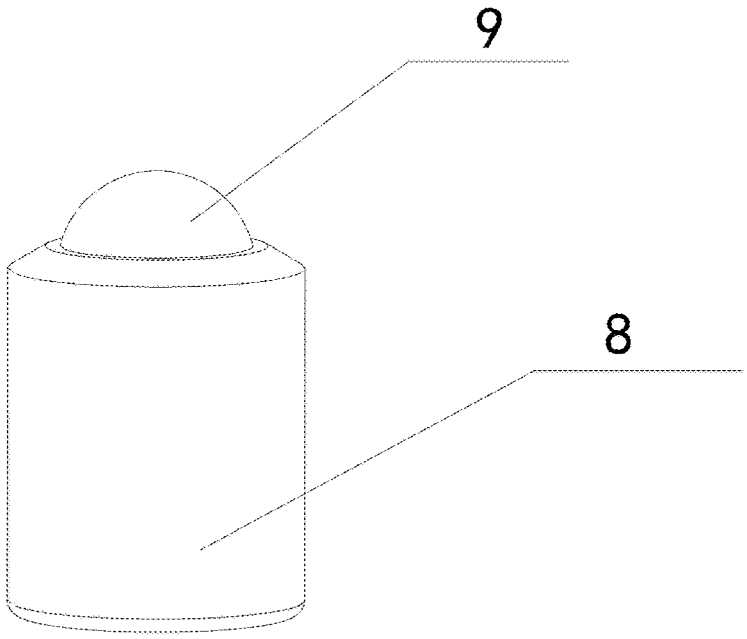
FIG. 9 is a perspective view of a cylinder of according to an embodiment.

Referring to FIGS. 3, 4 and 9, the LED lamp further includes at least one pair of cylinders 8 connected to the heat sink 1 and facing the lens plate 3. A telescopic rolling ball 9 is provided to an end of each cylinder 8 adjacent to the lens plate 3. Correspondingly, the lens plate 3 is provided with at least two pairs of circular grooves 10 configured to receive the pair of cylinders 8, respectively. When it is not necessary to adjust the light-emitting angle of the LED lamp, the telescopic rolling balls 9 abut against groove walls of one pair of the circular grooves 10. At this time, the lens plate 3 is located in a first position. When the light-emitting angle of the LED lamp needs to be adjusted, the lens plate 3 is pushed to move left or right. Since the telescopic rolling ball 9 is telescopic with respect to the cylinder 8, the telescopic rolling balls 9 on the cylinders 8 can slide from one pair of the circular grooves 10 to the other pair of the circular grooves 10. At this time, the lens plate 3 is located in a second position, so as to adjust the light-emitting angle of the LED lamp.

Specifically, the circular grooves 10 include a first circular groove 11, a second circular groove 12, a third circular groove 13, and a fourth circular groove 14. The telescopic rolling balls 9 include a first rolling ball 15 and a second rolling ball 16. When it is necessary to adjust the light-emitting angle of the LED lamp to be a first angle, for example, 45 degrees and 110 degrees, it is only necessary to push the lens plate 3 to enable the first rolling ball 15 to abut against the first circular groove 11 and the second rolling ball 16 to abut against the second circular groove 12. When it is necessary to adjust the light-emitting angle of the LED lamp to be a second angle, for example, 90 degrees and 90 degrees, it is only necessary to push the lens plate 3 to enable the first rolling ball 15 and the second rolling ball 16 to respectively move from the first circular groove 11 and the second circular groove 12 to the third circular groove 13 and the fourth circular groove 14.

Figure 6:
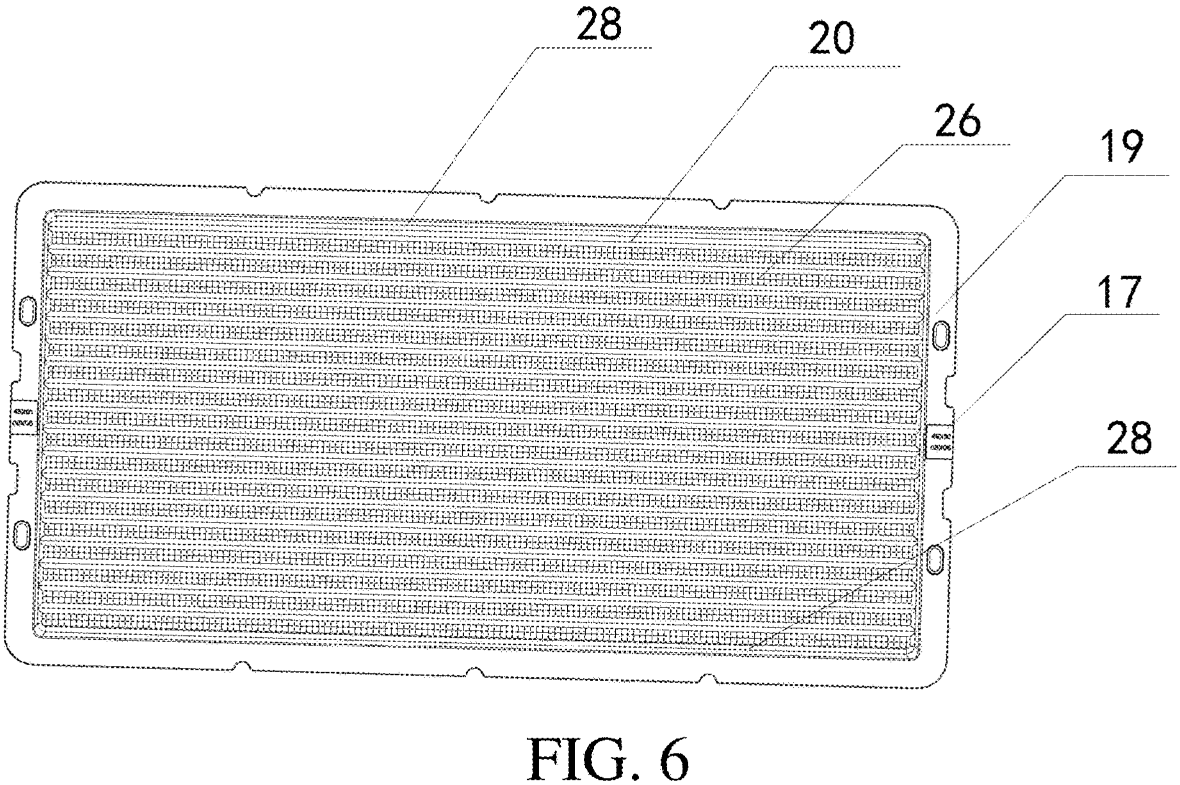
FIG. 6 is a front view of a lens plate in FIG. 5.

Referring to FIGS. 1 and 6, the lens plate 3 includes a dial 17. Correspondingly, the pressing frame 7 is provided with a display window 18 corresponding to the dial 17. The dial 17 can display the corresponding light-emitting angle through the display window 18, so that an operator can quickly adjust the required light-emitting angle.

Figure 7:
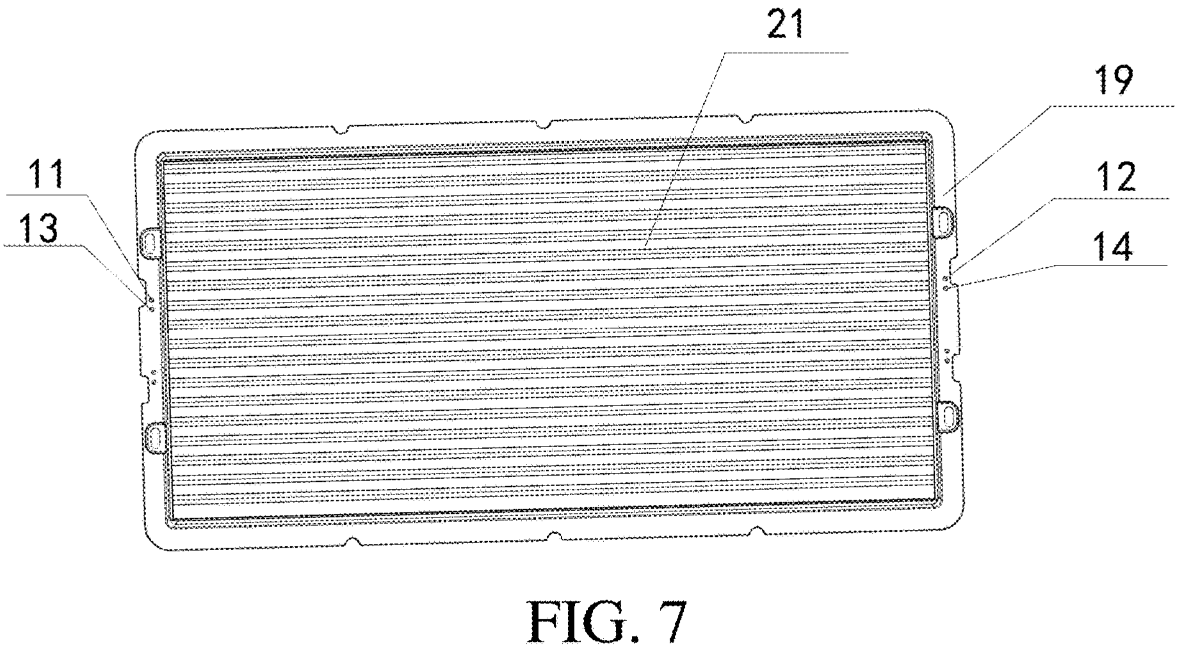
FIG. 7 is a rear view of the lens plate in FIG. 5.

Referring to FIGS. 6 and 7, the lens plate 3 includes a lens main body 19. The lens main body 19 includes a first surface and a second surface that are opposite to each other. The lens plate 3 includes an outer lens 20 provided on the first surface and an inner lens 20 provided the second surface corresponding to the outer lens 20. The outer lens 20 and the inner lens 21 are substantially strip-shaped. The inner lens 21 protrudes toward the LED lamp panel 2, and the outer lens 20 protrudes away from the LED lamp panel 2. Light emitted by the lamp beads 40 is firstly scattered by the inner lens 21, and then is converged by the outer lens 20 and emitted to an external environment.

Specifically, when the light emitted by the lamp beads 40 passes through the inner lens 21, the light is mixed, that is, the light is scattered, and chromatic aberration is prevented. Since the inner lens 21 is convex towards the LED lamp panel 2, that is, the inner lens 21 forms a strip curved surface toward the LED lamp panel 2. The light emitted by the lamp beads 40 is refracted through the inner lens 21 to a side of the outer lens 20 away from the lamp beads 40 and mixed together in the middle of the inner lens 21, that is, the light emitted by the lamp beads 40 is refracted from a middle position of the inner lens 21 on a side adjacent to the LED lamp panel 2 and from a peripheral position of the inner lens 21 on the side adjacent to the LED lamp panel 2 to a side of the inner lens 21 away from the LED lamp panel 2 and refracted to the middle of the inner lens 21 to be mixed. The light after being mixed is uniform without chromatic aberration. Meanwhile, the light after being mixed becomes soft, so that glare can be reduced. The light after being mixed is re-converged through the outer lens 20, so as to form light without chromatic aberration and satisfying the anti-glare requirement and transmitted to the external environment. Since the light is first scattered by the inner lens 21, the light will be uniform and soft without chromatic aberration, and then the light converged by the outer lens 20 will be softer and not dazzling. The outer lens 20 is equivalent to a strip-shaped convex lens, the light emitted by the lamp beads 40 is scattered through the inner lens 21, and the scattered light is re-converged through the outer lens 20 to form more uniform light without chromatic aberration, thereby satisfying the requirements of anti-glare.

In one embodiment, the outer lens 20 and the inner lens 21 are integrally formed. Alternatively, the outer lens 20 and the inner lens 21 may be assembled together by two separate elements.

Figure 8:
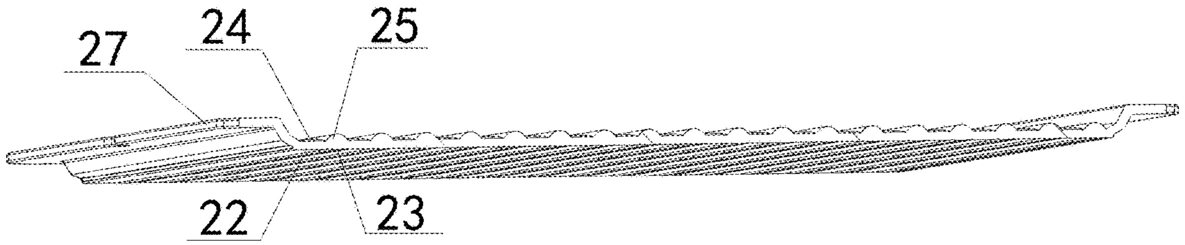
FIG. 8 is a sectional view of the lens plate in FIG. 5.

Referring to FIG. 8, the inner lens 21 includes a first inner lens 22 and a second inner lens 23. An outer surface of the first inner lens 22 and an outer surface of the second inner lens 23 are both flat surfaces.

The outer lens 20 includes a first outer lens 24 and a second outer lens 25. An outer surface of the first outer lens 24 and an outer surface of the second outer lens 25 are both convex arc-shaped surfaces. The outer surface of the second outer lens 25 is higher than the outer surface of the first outer lens 24. The first outer lens 24 includes a plurality of lens portions 26 arranged in rows.

Referring to FIGS. 6 and 8, the lens plate 3 is substantially rectangular. The LED lamp further includes a mounting plate 27 and at least one force applying portion 28 provided on an edge of the lens main body 19. The mounting plate 27 is movably connected to the groove wall 6. The force applying portion 28 is configured to be pushed to move the lens plate 3 left and right.

In an embodiment, two force applying portions 28 opposite to each other are provided. When one of the force applying portions 28 is pushed to move to the right, the lens plate 3 moves to the right, such that the first inner lens 22 is aligned with the lamp beads 40. The light emitted by the lamp beads 40 is scattered by the first inner lens 22 and then converged by the first outer lens 24. Angles of the light refracted by the first outer lens 24 are 90 degrees and 90 degrees. When the other force applying part 8 is pushed to move to the left, the lens plate 3 moves to the left, the second inner lens 23 is aligned with the lamp bead 40. The light emitted by the lamp bead 40 is scattered by the second inner lens 23 and then converged by the second outer lens 25. Angles of the light refracted by the second outer lens 25 are 45 degrees and 110 degrees.

The LED lamp further includes a power supply box 29 connected to a back side of the heat sink 1. The driving power supply 4 is mounted in the power supply box 29.

Figure 5:
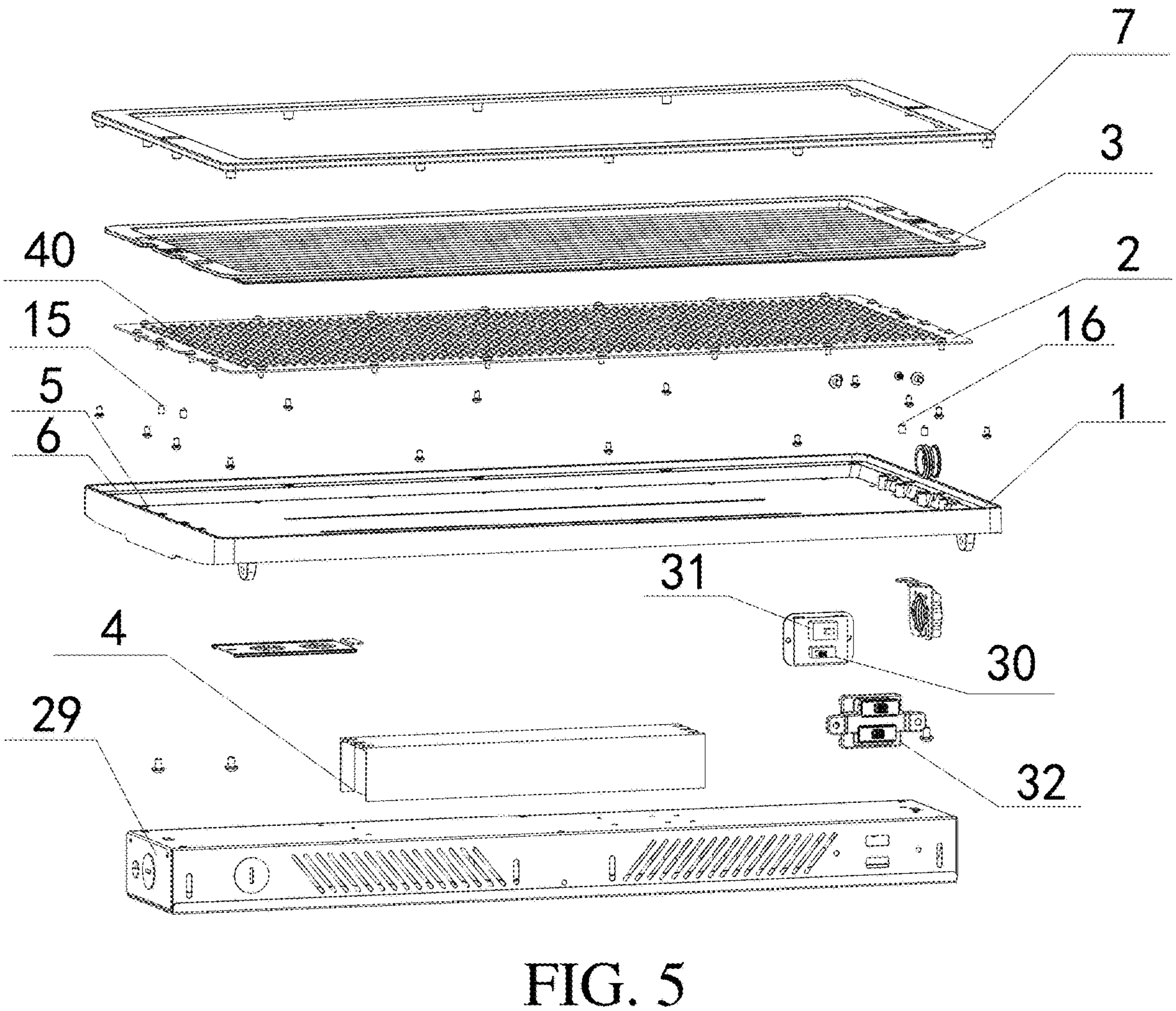
FIG. 5 is an exploded view of the LED lamp of FIG. 2.
Figure 10:
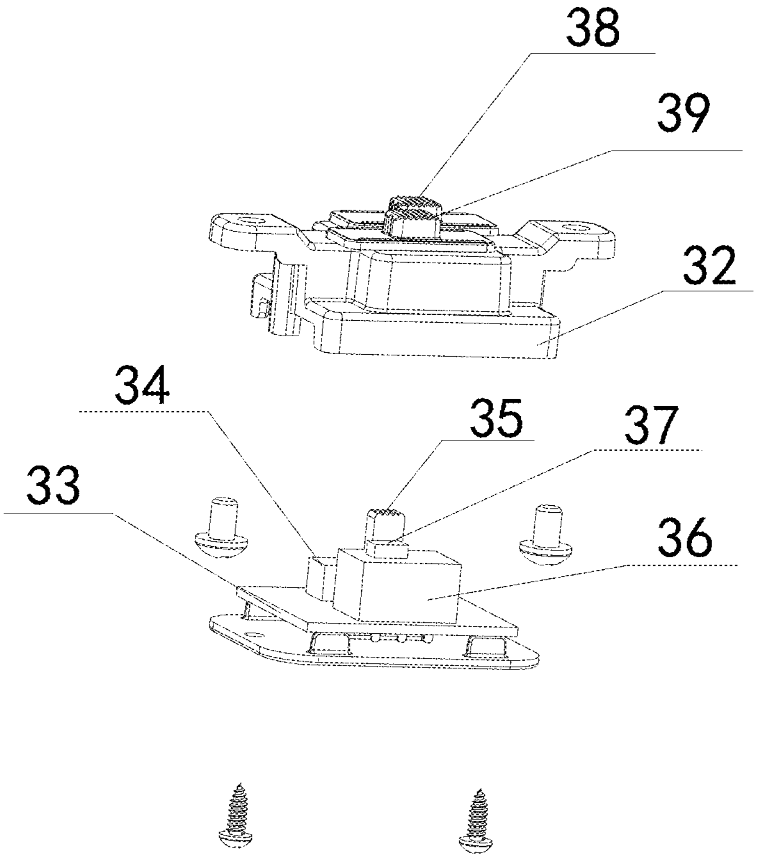
FIG. 10 is an exploded view of a power controller and a color temperature controller according to an embodiment.

Referring to FIGS. 5 and 10, the LED lamp further includes a power controller 30, a color temperature controller 31, and a switch box 32. The switch box 32 is mounted in the power supply box 29, and the power controller 30 and the color temperature controller 31 are mounted in the switch box 32. A bottom portion of the switch box 32 is fixed to the heat sink 1.

The power controller 30 includes a switch base 33, a first electronic switch 34, and a first toggle 35. The first electronic switch 34 is fixed to the switch base 33. The first electronic switch 34 is electrically connected to the driving power supply 4 and the LED lamp panel 2. The first toggle 35 is connected to the first electronic switch 34 and is configured to be toggled to change a state of the first electronic switch 34.

The color temperature controller 31 includes a switch base 33, a second electronic switch 36, and a second toggle 37. The second electronic switch 36 is fixed to the switch base 33. The second electronic switch 36 is electrically connected to the driving power supply 4 and the LED lamp panel 2. The second toggle 37 is connected to the second electronic switch 36 and is configured to be toggled to change a state of the second electronic switch 36.

The power controller 30 further includes a first toggle cover 38 fixed to the first toggle 35. The color temperature controller 31 further includes a second toggle cover 39 fixed to the second toggle 37. An end of the first toggle cover 38 away from the first electronic switch 34 and an end of the second toggle cover 39 away from the second electronic switch 36 extend out of the power box cover 29, so as to facilitate the user to toggle the first toggle 35 and the second toggle 37 through the first toggle cover 38 and the second toggle cover 39.

According to the LED lamp, when adjusting the light-emitting angle of the LED lamp, only the force applying portion 28 of the lens plate 3 needs to be manually pushed and pulled to move the lens plate 3 left and right without replacing the lens plate 3, so that the lamp beads 40 of the LED panel 2 can directly face different portions of lens plate 3, so as to adjust the light-emitting angle of the LED lamp, thereby saving the cost of purchasing the lens plate 3.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a heat sink, a front side of the heat sink being provided with a mounting groove, the heat sink comprising a groove wall enclosing the mounting groove;

an LED lamp panel mounted in the mounting groove;

a driving power supply electrically connected to the LED lamp panel and configured to supply power to the LED lamp panel;

a lens plate covering the LED lamp panel and movably connected to the groove wall;

a pressing frame covering the lens plate and fixed to the heat sink; and at least one pair of cylinders connected to the heat sink and facing the lens plate, wherein a telescopic rolling ball is provided to an end of each cylinder adjacent to the lens plate, the telescopic rolling ball abuts against the lens plate, and the lens plate is capable of sliding on the telescopic rolling ball.

2. The LED lamp according to claim 1, wherein the lens plate further comprises a dial, and the pressing frame is provided with a display window corresponding to the dial.

3. The LED lamp according to claim 2, wherein the lens plate comprises:

a lens main body comprising a first surface and a second surface that are opposite to each other;

an outer lens provided on the first surface; and an inner lens provided the second surface corresponding to the outer lens, wherein the outer lens and the inner lens are substantially strip-shaped, the inner lens protrudes toward the LED lamp panel, the outer lens protrudes away from the LED lamp panel, and light emitted by the LED lamp panel is scattered by the inner lens, and then converged by the outer lens and emitted to an external environment.

4. The LED lamp according to claim 3, wherein the outer lens comprises a first outer lens and a second outer lens, an outer surface of the first outer lens and an outer surface of the second outer lens are both convex arc-shaped surfaces, and the outer surface of the second outer lens is higher than the outer surface of the first outer lens.

5. The LED lamp according to claim 4, wherein the inner lens comprises a first inner lens and a second inner lens, and an outer surface of the first inner lens and an outer surface of the second inner lens are both flat surfaces.

6. The LED lamp according to claim 5, wherein the first outer lens comprises a plurality of lens portions arranged in rows.

7. The LED lamp according to claim 6, further comprising a mounting plate and a force applying portion provided on an edge of the lens main body, wherein the mounting plate is movably connected to the groove wall, and the force applying portion is configured to drive the lens plate to move.

8. The LED lamp according to claim 7, further comprising a power supply box connected to a back side of the heat sink, wherein the driving power supply is mounted in the power supply box.

9. The LED lamp according to claim 8, further comprising a power controller and a color temperature controller that are mounted in the power supply box, wherein the power controller comprises a switch base, a first electronic switch, and a first toggle, the first electronic switch is fixed to the switch base, the first electronic switch is electrically connected to the driving power supply and the LED lamp panel, the first toggle is connected to the first electronic switch and is configured to be toggled to change a state of the first electronic switch, the color temperature controller comprises a switch base, a second electronic switch, and a second toggle; the second electronic switch is fixed to the switch base, the second electronic switch is electrically connected to the driving power supply and the LED lamp panel, and the second toggle is connected to the second electronic switch and is configured to be toggled to change a state of the second electronic switch.

* * * * *